US012042919B2

(12) United States Patent
Tao et al.

(10) Patent No.: US 12,042,919 B2
(45) Date of Patent: Jul. 23, 2024

(54) PNEUMATIC TOOL AIR MOTOR WITH INTEGRATED AIR PRESSURE INDICATOR

(71) Applicant: Ingersoll-Rand Industrial U.S., Inc., Davidson, NC (US)

(72) Inventors: Huajun Tao, Shanghai (CN); Hongjie Zhou, Shanghai (CN); Yunzhong Yu, Shanghai (CN); James F. Bouchard, Easton, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 862 days.

(21) Appl. No.: 17/127,084

(22) Filed: Dec. 18, 2020

(65) Prior Publication Data

US 2022/0193881 A1 Jun. 23, 2022

(51) Int. Cl.
*B25F 5/00* (2006.01)
*B25F 5/02* (2006.01)
*B25B 21/02* (2006.01)

(52) U.S. Cl.
CPC ................ *B25F 5/02* (2013.01); *B25B 21/02* (2013.01)

(58) Field of Classification Search
CPC ..................................... B25F 5/00; B25F 5/02
See application file for complete search history.

(56) References Cited

U.S. PATENT DOCUMENTS 6,796,386 B2 * 9/2004 Izumisawa ................ B25F 5/00 173/93.5
2003/0121680 A1 * 7/2003 Izumisawa ................ B25F 5/00 173/93.5
2003/0230423 A1 * 12/2003 Izumisawa ............ B25B 23/145 173/107
2008/0066941 A1 * 3/2008 Kobayashi ................ B25F 5/00 173/218
2013/0082085 A1 4/2013 Largo
2014/0360744 A1 * 12/2014 Lawrence ........... B25B 23/1453 173/218

FOREIGN PATENT DOCUMENTS

IT 20090450 A1 12/2010
TW 201836776 A 10/2018
WO 2017147546 A2 8/2017

OTHER PUBLICATIONS

European Search Report for Application No. 21200205.9, dated Mar. 7, 2022.

* cited by examiner

*Primary Examiner* — Eyamindae C Jallow
(74) *Attorney, Agent, or Firm* — Kevin E. West; Advent, LLP

(57) ABSTRACT

A pneumatic tool includes, but is not limited to, an air motor cylinder defining an interior configured to receive an air motor and further defining an inlet configured to receive pressurized air to supply to the air motor; a tool handle defining a source fluid passageway fluidically coupled between the inlet and an air inlet configured to receive pressurized air, the source fluid passageway configured to direct a first portion of pressurized air received by the inlet to the inlet of the air motor cylinder; an air pressure indicator coupled to the air motor cylinder and configured to provide an indication of a dynamic air pressure of the pneumatic tool; and an indicator fluid passageway fluidically coupled between the air pressure indicator and the source fluid passageway, the indicator fluid passageway configured to divert a second portion of pressurized air received by the air inlet to the air pressure indicator.

18 Claims, 9 Drawing Sheets

PNEUMATIC TOOL AIR MOTOR WITH INTEGRATED AIR PRESSURE INDICATOR

BACKGROUND

Pneumatic tools utilize compressed fluids to provide work for various applications. For example, pneumatic tools can be coupled with compressed air sources and incorporate pneumatic motors to convert the compressed air to work for interacting with fasteners.

SUMMARY

Pneumatic tools having integrated air pressure indictors are described. In an aspect, a pneumatic tool includes, but is not limited to, an air motor cylinder, a tool handle, an air pressure indicator, and an indicator fluid passageway. The air motor cylinder defines an interior configured to receive an air motor. The air motor cylinder further defines an inlet configured to receive pressurized air to supply to the air motor. The tool handle is coupled to the air motor cylinder and defines a source fluid passageway fluidically coupled between the inlet of the air motor cylinder and an air inlet configured to receive pressurized air from a pressurized air source. The source fluid passageway is configured to direct a first portion of pressurized air received by the air inlet to the inlet of the air motor cylinder. The air pressure indicator is coupled to the air motor cylinder and configured to provide an indication of a dynamic air pressure of the pneumatic tool. The indicator fluid passageway is fluidically coupled between the air pressure indicator and the source fluid passageway and is configured to divert a second portion of pressurized air received by the air inlet to the air pressure indicator.

In an aspect, a pneumatic tool includes, but is not limited to, an air motor cylinder, a tool handle, an air pressure indicator, and an indicator fluid passageway. The air motor cylinder defines an interior configured to receive an air motor. The air motor cylinder further defines an inlet configured to receive pressurized air to supply to the air motor. The tool handle is coupled to the air motor cylinder and defines a source fluid passageway fluidically coupled between the inlet of the air motor cylinder and an air inlet configured to receive pressurized air from a pressurized air source. The source fluid passageway is configured to direct a first portion of pressurized air received by the air inlet to the inlet of the air motor cylinder. The air pressure indicator is coupled to the air motor cylinder and is configured to provide an indication of a dynamic air pressure of the pneumatic tool. The indicator fluid passageway is defined by the air motor cylinder and fluidically coupled between the air pressure indicator and the source fluid passageway. The indicator fluid passageway is configured to divert a second portion of pressurized air received by the air inlet to the air pressure indicator, bypassing the inlet of the air motor cylinder.

In an aspect, a pneumatic tool includes, but is not limited to, an air motor cylinder, a tool handle, an air pressure indicator, and an indicator fluid passageway. The air motor cylinder defines an interior configured to receive an air motor. The air motor cylinder further defines an inlet configured to receive pressurized air to supply to the air motor. The tool handle is coupled to the air motor cylinder and defines a source fluid passageway fluidically coupled between the inlet of the air motor cylinder and an air inlet configured to receive pressurized air from a pressurized air source. The source fluid passageway is configured to direct a first portion of pressurized air received by the air inlet to the inlet of the air motor cylinder. The air pressure indicator is coupled to the air motor cylinder and is configured to provide an indication of a dynamic air pressure of the pneumatic tool. The air pressure indicator includes a plunger slidably received within a chamber at least partially defined by the air motor cylinder. The air pressure indicator further includes a spring biasing a longitudinal position of the plunger within the chamber. The indicator fluid passageway is defined by the air motor cylinder and fluidically coupled between the chamber of the air pressure indicator and the source fluid passageway. The indicator fluid passageway is configured to divert a second portion of pressurized air received by the air inlet to the chamber, bypassing the inlet of the air motor cylinder.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1A:
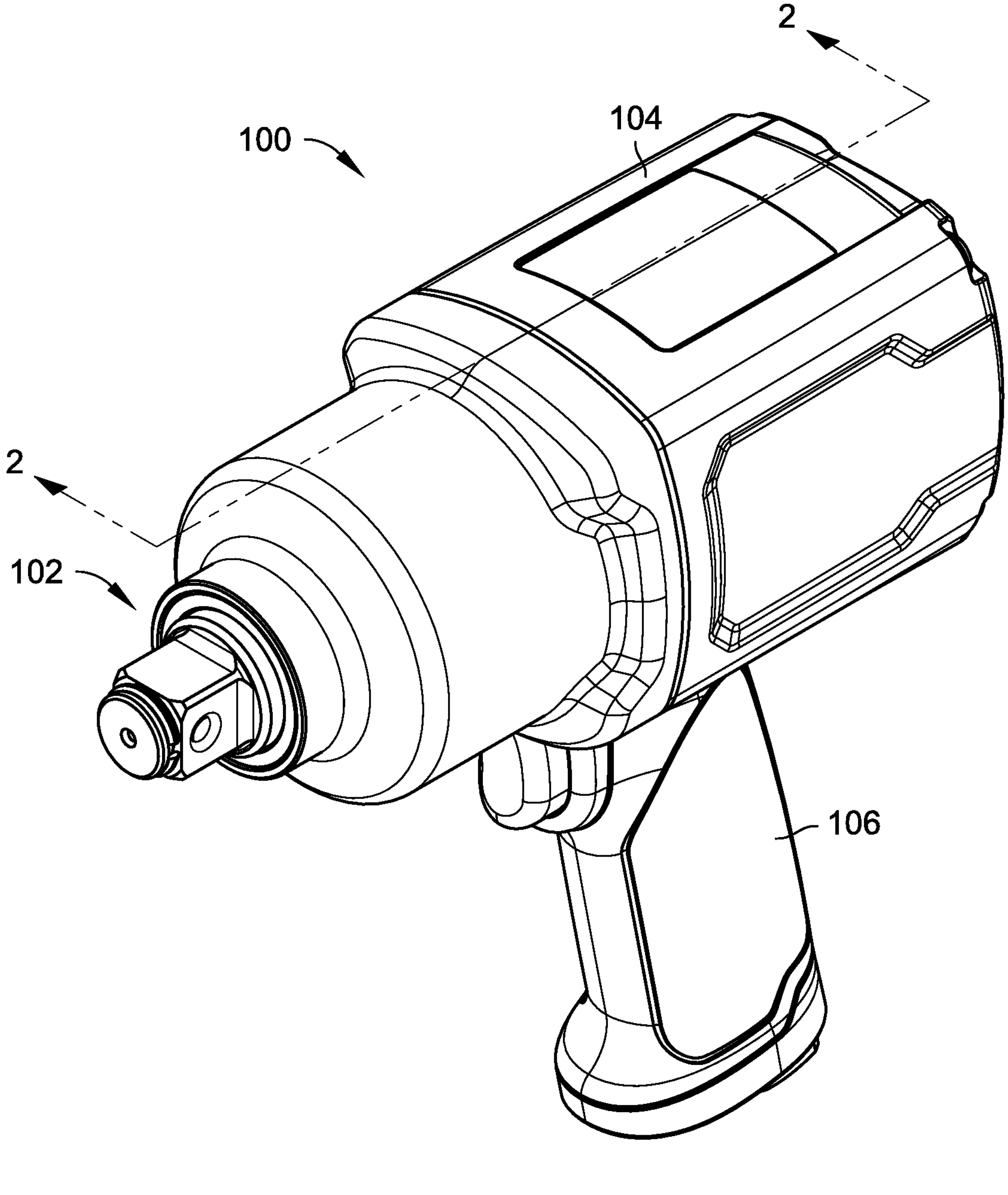
FIG. 1A is an isometric view illustrating a pneumatic tool having an air motor with an integrated air pressure indicator in accordance with an example embodiment of the present disclosure.

Pneumatic tools are mechanical devices that convert compressed fluids to work via interaction between a pneumatic motor and the compressed fluids. Example pneumatic tools include, but are not limited to, impact wrenches, nail guns, drills, hammers, saws, brushes, sprayers, shears, and grinders. In general, a pneumatic tool receives a compressed fluid, such as compressed air from a compressor source, and directs the compressed fluid to a fluid motor to provide work to act on a bit, fastener, coupler, or the like, with a desired output that depends on the tool design. For example, a pneumatic impact wrench can receive compressed air into the tool body and direct the air to an air motor, which rotates within the motor housing to act upon a rotary hammer and anvil system used to turn a fastener (e.g., a nut).

The pressure of compressed fluid introduced to the pneumatic tool can affect the performance of the tool during operation. The fluid motor and working portions of the pneumatic tool can be designed based on operating ranges of fluid pressure. In general, the output that a pneumatic tool can provide is proportional to the pressure of fluid supplied to the tool. If the fluid pressure is lower than a preferred operating range, the pneumatic tool may not provide an output that meets engineered standards (e.g., resulting in reduced torque, reduced driving, etc.). For example, if an air pressure hose is coupled to the pneumatic tool that does not provide a minimum air pressure to the tool (e.g., such as through a restrictive diameter of the air pressure hose, a regulator setting of an air compressor supplying the compressed air, etc.), the pneumatic tool may output a reduced torque as compared to when the pneumatic tool is supplied with air pressure within a predetermined operating range. If the fluid pressure is higher than a preferred operating range, portions of the pneumatic tool (e.g., drive train) may degrade at a rate that exceeds an engineered durability of the tool or otherwise damage the tool during use.

The operating range of fluid pressures for a pneumatic tool may be designed based on a range of dynamic fluid pressures, where the dynamic fluid pressure is the pressure of the tool while the tool is in operation. For example, the dynamic fluid pressure for a pneumatic impact wrench can be the pressure within one or more portions of the pneumatic tool while the drive train is rotating. Dynamic fluid pressure differs from a static pressure of compressed fluid available to the pneumatic tool while the pneumatic tool is not operating. For example, if the pneumatic tool is designed to operate at ninety (90) psi dynamic fluid pressure, an operator can supply insufficient air pressure to the pneumatic tool if a pressure gauge on an output of a source of the pressurized fluid is set to ninety (90) psi (e.g., read by a pressure gauge on an air hose of an air compressor). For instance, while the supply air pressure is made available to the tool at ninety (90) psi, operation of the pneumatic tool can result in a decrease of pressure within the tool, resulting in a dynamic fluid pressure that is less than the designed dynamic fluid pressure, which in turn causes a reduction in torque or other performance metric of the tool. Moreover, pressure measurements made within lines supplying pressurized fluids to the pneumatic tool can require additional sensors that add to the complexity of the air pressure coupling, that require invasive measurements that decrease durability of the tool or supply lines, that add cumbersome equipment that has to be manipulated by a user during operation of the tool, and the like.

Accordingly, the present disclosure is directed, at least in part, to systems and methods for integrating an air pressure indicator with a pneumatic tool to measure dynamic air pressures for the tool. In an aspect, the pneumatic tool includes an indicator fluid passageway that fluidically couples a chamber that houses the air pressure indicator with a source fluid passageway. The source fluid passageway in turn fluidically couples an inlet of an air motor cylinder with an inlet of pressurized air for the pneumatic tool. The indicator fluid passageway diverts pressurized air from the source fluid passageway to the chamber housing the air pressure indicator via the indicator fluid passageway. In implementations, the source fluid passageway is provided within a handle of the pneumatic tool to supply pressurized air to the air motor cylinder, where a portion of the air is diverted toward the chamber that houses the air pressure indicator via the indicator fluid passageway before that portion of pressurized air enters the air motor cylinder. For example, the handle can include an inlet bushing assembly to couple with a source of pressurized air (e.g., a hose from a pressurized air source), where the inlet bushing assembly includes a switch valve whose position is controlled by a trigger of the pneumatic tool to control flow of the pressurized air into the pneumatic tool. The source fluid passageway extends between the switch valve and the inlet of the air motor cylinder. The indicator fluid passageway includes an indicator intake aperture that intercepts the source fluid passageway to draw a portion of air traveling from the switch valve into the indicator fluid passageway while permitting the remainder of air to travel into the air motor cylinder via the inlet (e.g., at a motor supply region of the handle). The positioning of the indicator fluid passageway permits receipt of pressurized air during forward and reverse operations of the pneumatic tool to provide a user of the pneumatic tool an indication of the dynamic air pressure during such forward and reverse operations.

The air pressure indicator receives the pressurized air into the chamber that houses the air pressure indicator to permit the pressurized air to interact with portions of the air pressure indicator. In an aspect, the air pressure indicator includes a plunger slidably coupled within the chamber with a spring coupled within the chamber to bias the plunger (e.g., at a longitudinal position along the chamber). The chamber can include an air inlet that couples with the indicator fluid passageway to introduce the pressurized air to the plunger. The pressurized air can then push against the plunger which in turn pushes against the spring. The spring compresses based on the amount of air pressure introduced to the chamber. The plunger can include a pointer that slides with the plunger to indicate a relative air pressure as the plunger is pushed by the pressurized air. For example, the air pressure indicator can include a display that displays information to the user based on the position of the pointer relative to the display. In implementations, the plunger includes an air receipt structure at an end of the plunger positioned adjacent the air inlet of the chamber. The air receipt structure provides an offset for the face of the plunger into which the pressurized air can enter and against which the pressurized air pushes, to provide an area for pressure to build within the chamber, such as upon initial startup of the pneumatic tool.

EXAMPLE IMPLEMENTATIONS

Referring generally to FIGS. 1A through 6, pneumatic tools 100 are described in accordance with example embodiments of the present disclosure. The pneumatic tool 100 shown in FIG. 1A is provided as a pneumatic impact wrench generally having an impact mechanism assembly 102, a housing 104, and a handle 106, however the pneumatic tool 100 is not limited to an impact wrench. For example, the pneumatic tool 100 can be configured as pneumatic devices including, but not limited to, nail guns, drills, hammers, saws, brushes, sprayers, shears, grinders, and the like. The pneumatic tool 100 also includes an integrated air pressure indicator 108. For example, referring to FIG. 1B, the pneumatic tool includes the air pressure indicator 108 coupled to the housing 104 at a rear portion 110 of the pneumatic tool 100 (e.g., opposite the impact mechanism assembly 102). The pneumatic tool 100 receives pressurized air from a pressurized air source from an air inlet 112 coupled with the handle 106. For instance, the handle 106 can house an air inlet bushing assembly that controls the flow of air made available from the pressurized air source, such as an air compressor or pressurized air supply.

In implementations, the handle 106 directs the flow of pressurized air from the air inlet 112 to an air motor cylinder supported within the housing 104. For example, referring to FIG. 2, the handle 106 can define a source fluid passageway 200 positioned between the air inlet 112 and an air motor cylinder 202 that contains an air motor incorporating vanes 204 against which the pressurized air pushes to rotate the vanes 204 within the air motor cylinder 202 and impart movement to the impact mechanism assembly 102. The source fluid passageway 200 can direct pressurized air received from the air inlet 112 to an inlet 206 (also shown in FIG. 3) of the air motor cylinder 202 to permit interaction between the air and the vanes 204.

The pneumatic tool 100 includes an indicator fluid passageway 208 that fluidically couples the air pressure indicator 108 with the source fluid passageway 200 to direct pressurized air received from the air inlet 112 to the air pressure indicator 108. In implementations, the indicator fluid passageway 208 is a continuous passageway defined by the air motor cylinder 202 to couple the air pressure indicator 108 with the source fluid passageway 200. For example, the air motor cylinder 202 can define the indicator fluid passageway 208 by including a first channel 210, a second channel 212 intersecting the first channel 210, a third channel 214 intersecting the second channel 212, and a fourth channel 400 (e.g., shown in FIG. 4) intersecting the third channel 214. The indicator fluid passageway 208 can be formed in the air motor cylinder 202 via drilling channels into the air motor cylinder 202, molding of channels, casting of channels, or the like.

Figure 2:
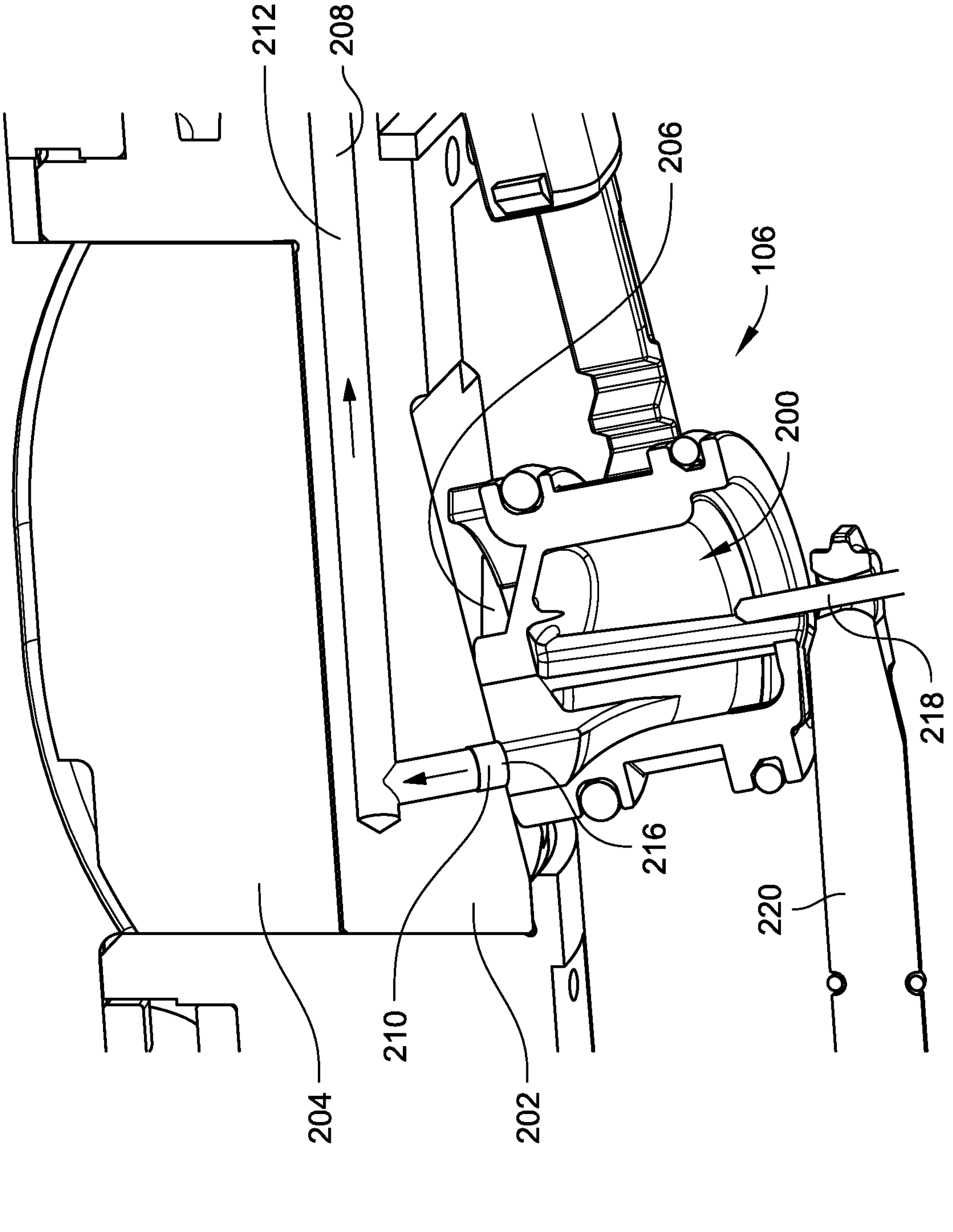
FIG. 2 is a partial cross-sectional side elevation view of the pneumatic tool illustrated in FIG. 1A, taken on the line 2-2 in FIG. 1A.
Figure 3:
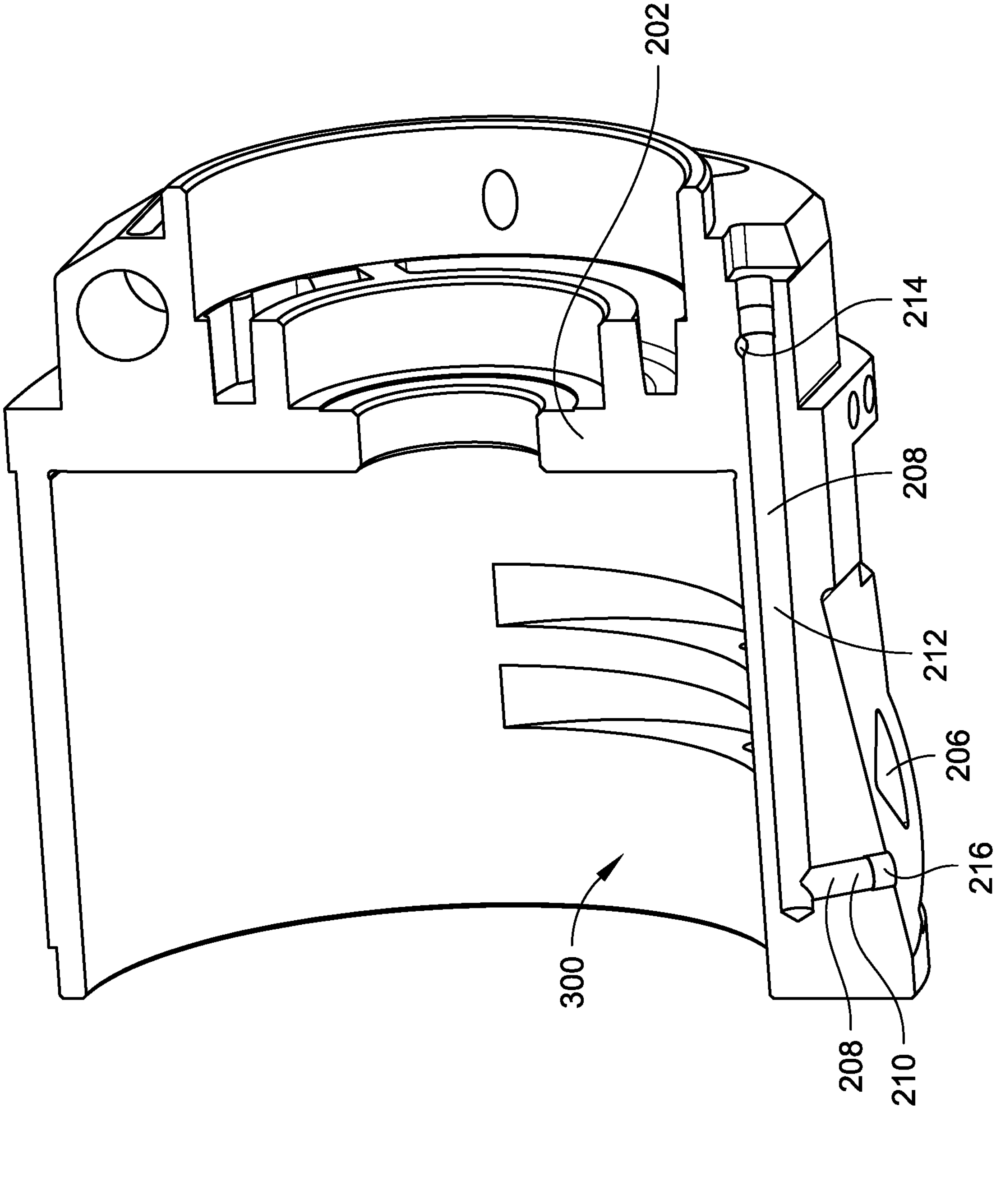
FIG. 3 is a partial cross-sectional side elevation view of an air motor cylinder in accordance with an example embodiment of the present disclosure.

The first channel 210 includes an indicator intake aperture 216 that intercepts the source fluid passageway 200 and fluidically couples the source fluid passageway 200 with the first channel 210 to draw a portion of air received from the air inlet 112 into the indicator fluid passageway 208 via the first channel 210 while permitting the remainder of air to travel into an interior 300 of the air motor cylinder 202 via the inlet 206 (e.g., to interact with the vanes 204 of the air motor). As shown in FIG. 2, the first channel 210 extends upwards from the handle 106 towards the interior 300 of the air motor cylinder 202, but does not intersect with the interior 300. The air is then directed from the first channel 210 into the second channel 212 which is shown in FIG. 2 as extending towards the rear portion 110 of the pneumatic tool 100. The air is then directed from the second channel 212 into the third channel 214 which is shown in FIG. 2 as extending upwards from the second channel 212 along the rear portion 110 of the pneumatic tool 100. The air is then directed from the third channel 214 into the fourth channel 400, where the air is directed to the air pressure indicator 108, described further herein. While the indicator fluid passageway 208 has been described in example implementations as being defined by channels 210, 212, 214, and 400 formed in the air motor cylinder 202, the indicator fluid passageway 208 is not limited to such configurations. For example, the indicator fluid passageway 208 can include fewer or greater numbers of channels, can be formed by another portion of the pneumatic tool, can include different orientations of the channels, or the like.

The positioning of the indicator intake aperture 216 relative to the inlet 206 of the air motor cylinder 202 facilitates providing information about dynamic air pressures of the pneumatic tool 100 during forward and reverse operations of the pneumatic tool 100 via the air pressure indicator 108. For instance, the indicator intake aperture 216 draws pressurized air into the indicator fluid passageway 208 (e.g., via the first channel 210) from the same source fluid passageway 200 (e.g., a motor supply region) that is coupled with the inlet 206 of the air motor cylinder 202 through which the remainder of the pressurized air received from the air inlet 112 flows into the interior 300 of the air motor cylinder 202. In implementations, the handle 106 includes an air inlet bushing assembly 218 that controls the flow of air made available from the pressurized air source (e.g., through interaction with a trigger 220) to direct the air for forward and reverse operation of the pneumatic tool 100. The indicator intake aperture 216 is positioned downstream from the air inlet bushing assembly 218 to receive pressurized air flowing through the air inlet bushing assembly 218 in forward or reverse operation configurations and to direct the pressurized air to the air pressure indicator 108 via the indicator fluid passageway 208.

Figure 4:
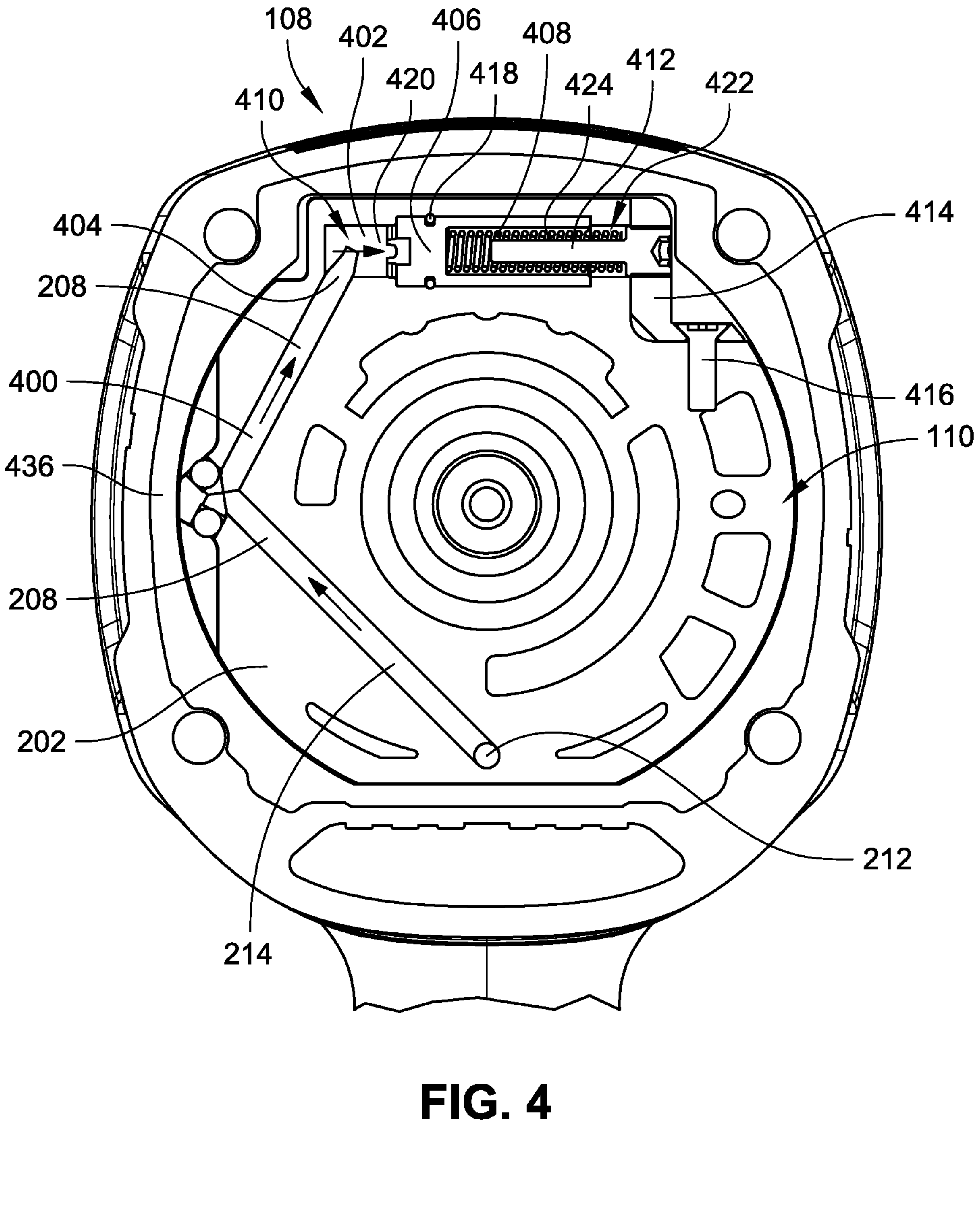
FIG. 4 is a partial cross-sectional elevation view of a rear portion the pneumatic tool illustrated in FIG. 1A, taken on the line 4-4 in FIG. 1A.

Referring to FIG. 4, an example air pressure indicator 108 is shown positioned at the rear portion 110 of the pneumatic tool 100. The air pressure indicator 108 includes a chamber 402 fluidically coupled with the indicator fluid passageway 208 to receive pressurized air received from the air inlet 112 (e.g., received into the indicator intake aperture 216 from the source fluid passageway 200). For example, the chamber 402 can be formed in the air motor cylinder 202, which fluidically couples the indicator fluid passageway 208 with the chamber 402. In implementations, the chamber 402 includes an air inlet 404 coupled with the fourth channel 400 to direct air into the chamber 402. The air pressure indicator 108 is shown including a plunger 406 positioned within the chamber 402. The plunger 406 is configured to slide within the chamber 402 upon application of pressurized air against the plunger 406. For example, the air pressure indicator 108 can include a spring 408 to bias the plunger 406 towards a first end 410 of the chamber 402 along a longitudinal orientation of the chamber 402. In implementations, the air inlet 404 is positioned at the first end 410 of the chamber 402 to introduce the pressurized air into the chamber 402 to push the plunger 406 against the spring 408. The spring 408 compresses based on the intensity of air pressure introduced to the chamber 402 through the air inlet 404.

The plunger 406 and the spring 408 can be positioned within the chamber 402 via a plug 412 secured to the air motor cylinder 202. For example, the plug 412 can be secured to the air motor cylinder 202 via a bracket 414 fixed against the air motor cylinder 202 with a fastener 416 (e.g., a pin, a screw, etc.). The plug 412 and the bracket 414 can include complementary threading such that the longitudinal position of the plug 412 within the chamber 402 can be adjusted through turning of the plug 412 relative to the bracket 414. Adjustment of the plug 412 within the chamber 402 adjusts the positioning of the spring 408 and the resting position of the plunger 406, which facilitates calibration of the air pressure indicator 108, described further herein. In implementations, the plunger 406 includes a seal 418 around an exterior surface of the plunger 406 to provide an air-tight barrier between the plunger 406 and an interior surface 420 of the chamber 402. The seal 418 can include, but is not limited to, an O-ring, a gasket, or other structure.

In implementations, the air pressure indicator 108 includes a pointer 500 (e.g., shown in FIGS. 5A, 5B) coupled to the plunger 406. As the plunger 406 slides within the chamber 402, the pointer 500 moves proportionally based on physical coupling between the pointer 500 and the plunger 406. For example, a bracket 502 can couple the pointer 500 to the plunger 406, where the bracket 502 can slide within a slot 504 formed in a housing 506 of the air pressure indicator 108. The housing 506 or another portion of the air pressure indicator 108 can include markings, pictures, coloration, or other indicators to provide information regarding a dynamic air pressure of the pneumatic tool 100 as the pointer 500 is positioned by the plunger 406 upon application of air pressure to the air pressure indicator 108 from the indicator fluid passageway 208.

Figure 5A:
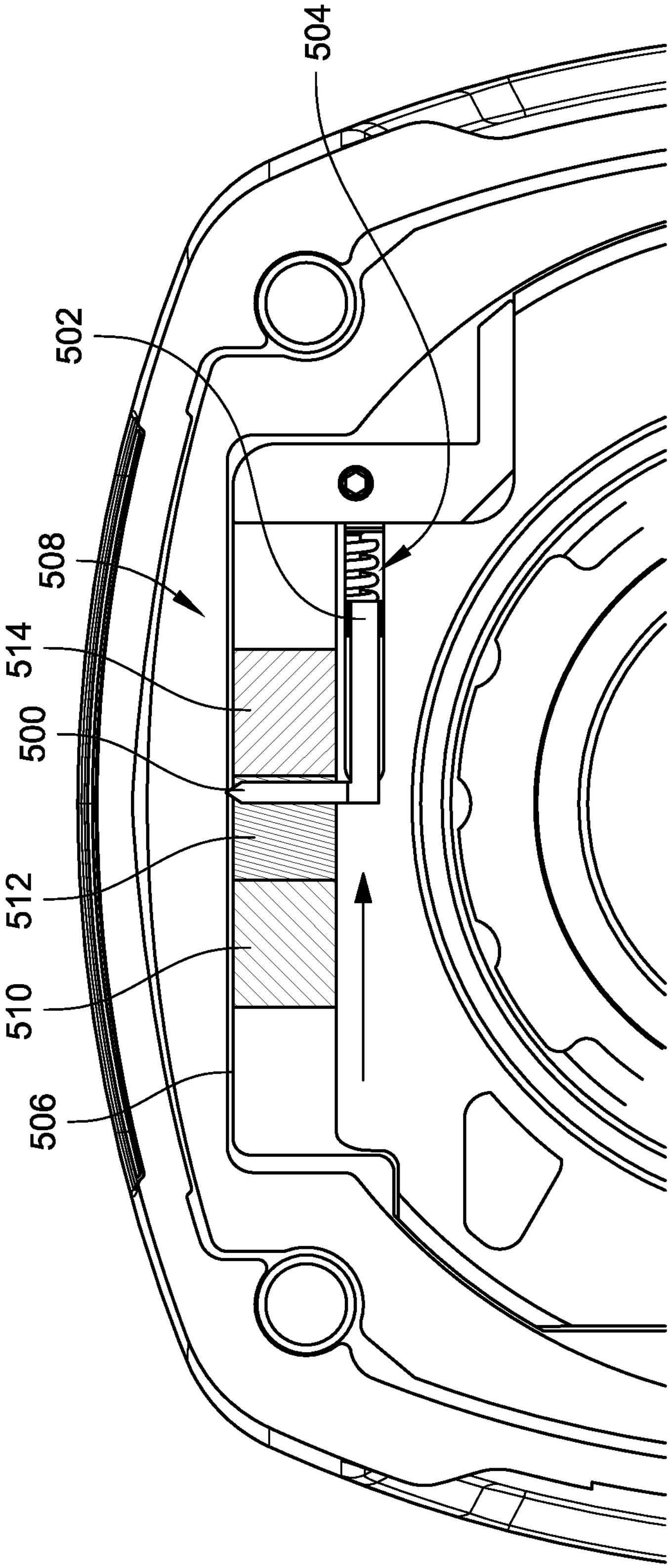
FIG. 5A is an air pressure indicator integrated with a pneumatic tool, such as the pneumatic tool illustrated in FIG. 1, in accordance with example embodiments of the present disclosure.
Figure 5B:
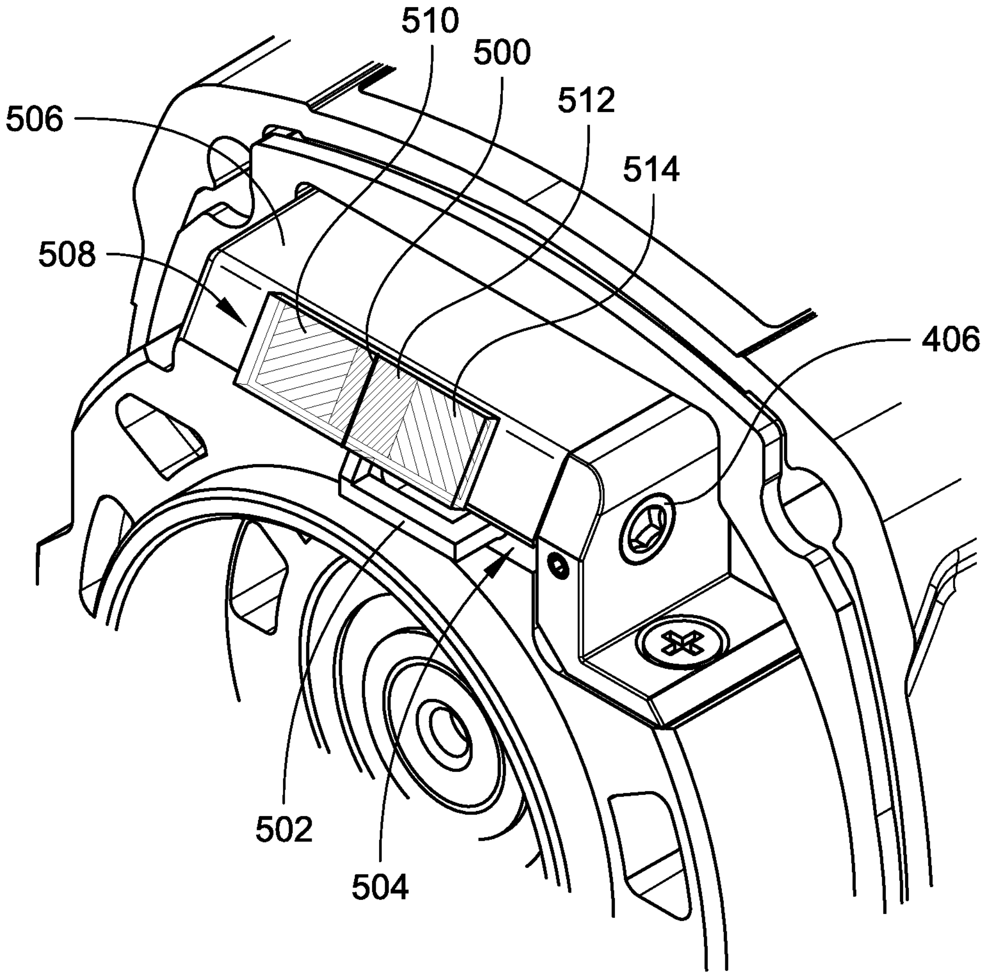
FIG. 5B is an air pressure indicator integrated with a pneumatic tool, such as the pneumatic tool illustrated in FIG. 1, in accordance with example embodiments of the present disclosure.

For example, the air pressure indicators 108 shown in FIGS. 5A and 5B include a display 508 including a first region 510, a second region 512, and a third region 514. The air pressure indicator 108 can be calibrated such that when the pointer 500 points to the first region 510, the pneumatic tool 100 is operating with a dynamic air pressure that is less than a predetermined dynamic air pressure threshold, when the pointer 500 points to the second region 512, the pneumatic tool 100 is operating with a dynamic air pressure that is within the predetermined dynamic air pressure threshold, and when the pointer 500 points to the third region 514, the pneumatic tool 100 is operating with a dynamic air pressure that is greater than the predetermined dynamic air pressure threshold. For example, if the pneumatic tool 100 is designed to operate efficiently at a dynamic air pressure of ninety (90) psi, the predetermined dynamic air pressure threshold can be a range from about eighty (80) psi to about one hundred (100) psi. If the pointer 500 points to the first region 510, the pneumatic tool 100 is operating with a dynamic air pressure that is less than about eighty (80) psi, where the display 508 indicates to a user that the pneumatic tool 100 may not be operating at an efficient output (e.g., less torque output than the pneumatic tool 100 is capable of producing). If the pointer 500 points to the second region 512, the pneumatic tool 100 is operating with a dynamic air pressure that is from about eighty (80) psi to about 100 psi, where the display 508 indicates to a user that the pneumatic tool 100 may be operating at an efficient output (e.g., within a designed torque output for the pneumatic tool 100). If the pointer 500 points to the third region 514, the pneumatic tool 100 is operating with a dynamic air pressure that is greater than about one hundred (100) psi, where the display 508 indicates to a user that the pneumatic tool 100 may be operating above preferred air pressure tolerances (e.g., risk of excess wear of the drive train or other portions of the pneumatic tool 100).

The air pressure indicators 108 may be calibrated such that the pointer 500 points to a predetermined region of the display 508 during dynamic air pressures experienced by the pneumatic tool 100 within the predetermined dynamic air pressure threshold. For example, the longitudinal position of the plug 412 within the chamber 402 can be adjusted (e.g., via turning of the plug 412 relative to the bracket 414) to push the spring towards the first end 410 of the chamber 402 or towards a second end 422 of the chamber 402 (e.g., adjacent where the plug 412 is mounted to the bracket 414) to position the pointer 500 within the second region 512 during operation of the pneumatic tool 100 within the predetermined dynamic air pressure threshold. If the pneumatic tool experiences pressures less than the predetermined dynamic air pressure threshold, then the positioning of the spring 408 causes the spring 408 to push the plunger 406 towards the first end 410 of the chamber 402, which causes the pointer 500 to shift towards the first end 410 (e.g., to point at the first region 510). If the pneumatic tool experiences pressures greater than the predetermined dynamic air pressure threshold, then the air pressure pushes against the plunger 406 to a degree that compresses the spring 408 towards the second end 422 of the chamber 402, which causes the pointer 500 to shift towards the second end 422 (e.g., to point at the third region 514). The display 508 can include visual differences between the differing regions, such as by providing the first region 510 as a first color or image, the second region 512 as a second color or image, and the third region 514 as a third color or image. While the display 508 has been described with an example embodiment of a three-region display, the display 508 is not limited to three regions and can include fewer than three regions or greater than three regions to provide varying levels of air pressure information to the user of the pneumatic tool 100.

Figure 1B:
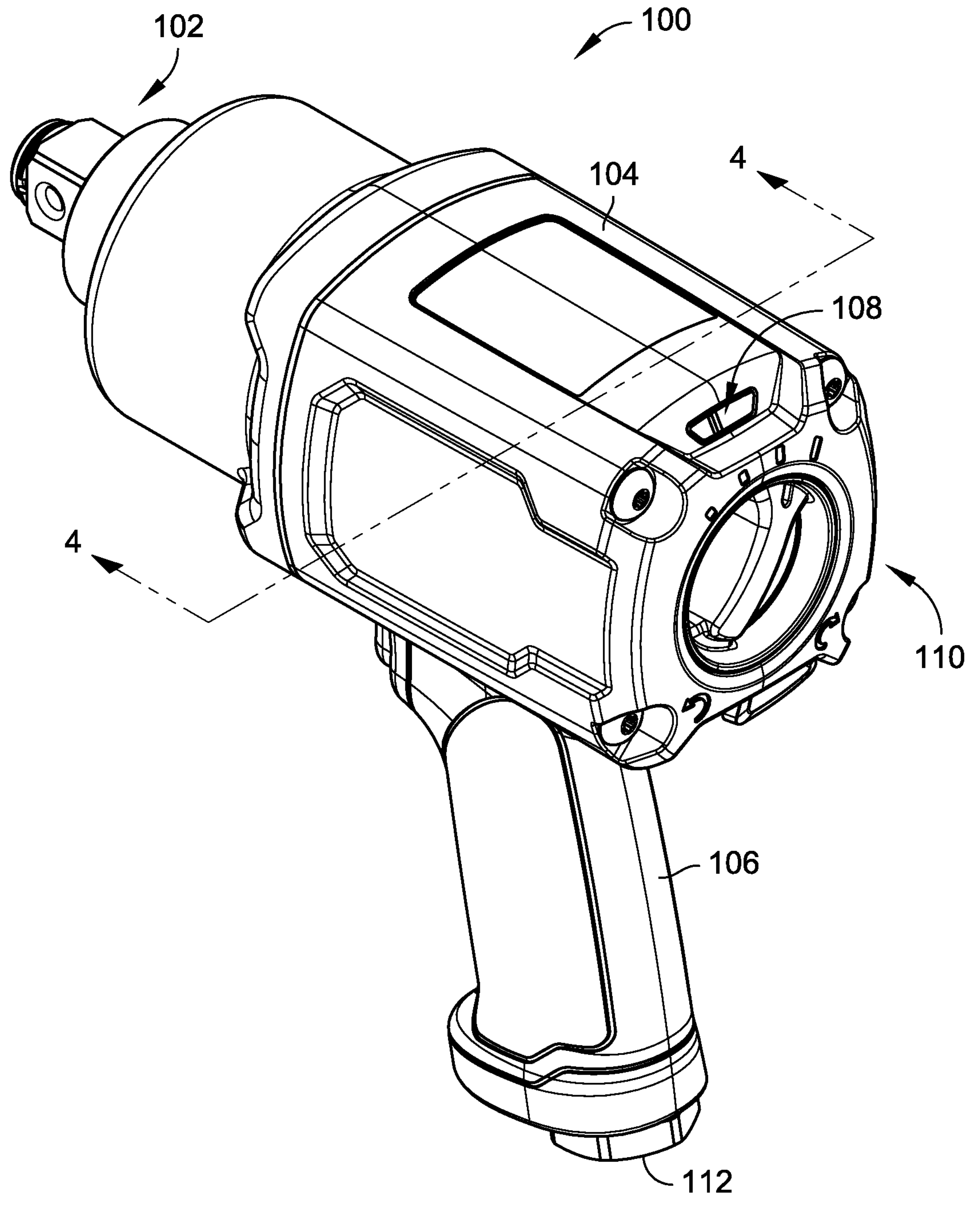
FIG. 1B is an isometric view of a rear portion of the pneumatic tool illustrated in FIG. 1A.
Figure 5C:
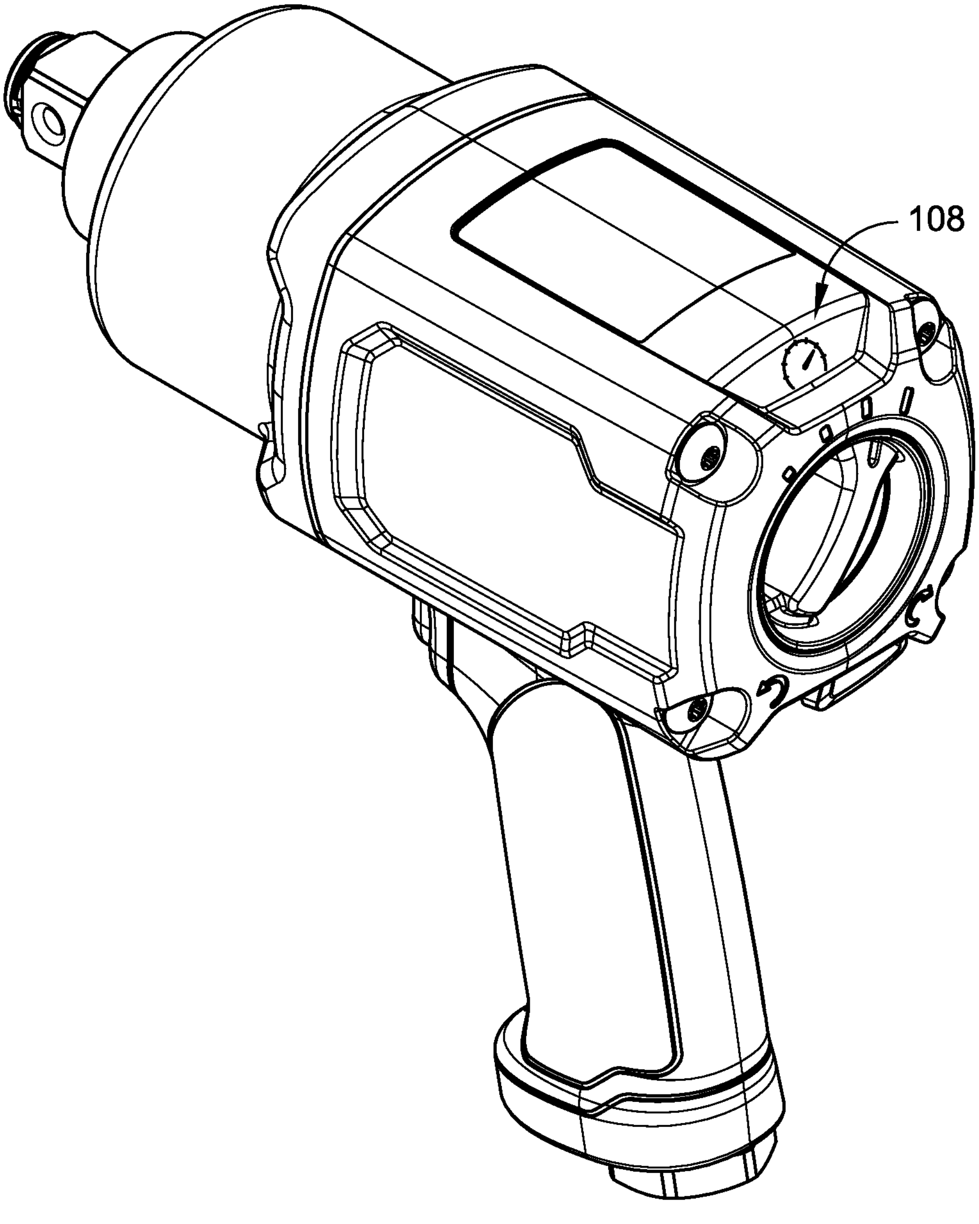
FIG. 5C is an air pressure indicator integrated with a pneumatic tool, such as the pneumatic tool illustrated in FIG. 1, in accordance with example embodiments of the present disclosure.
Figure 6:
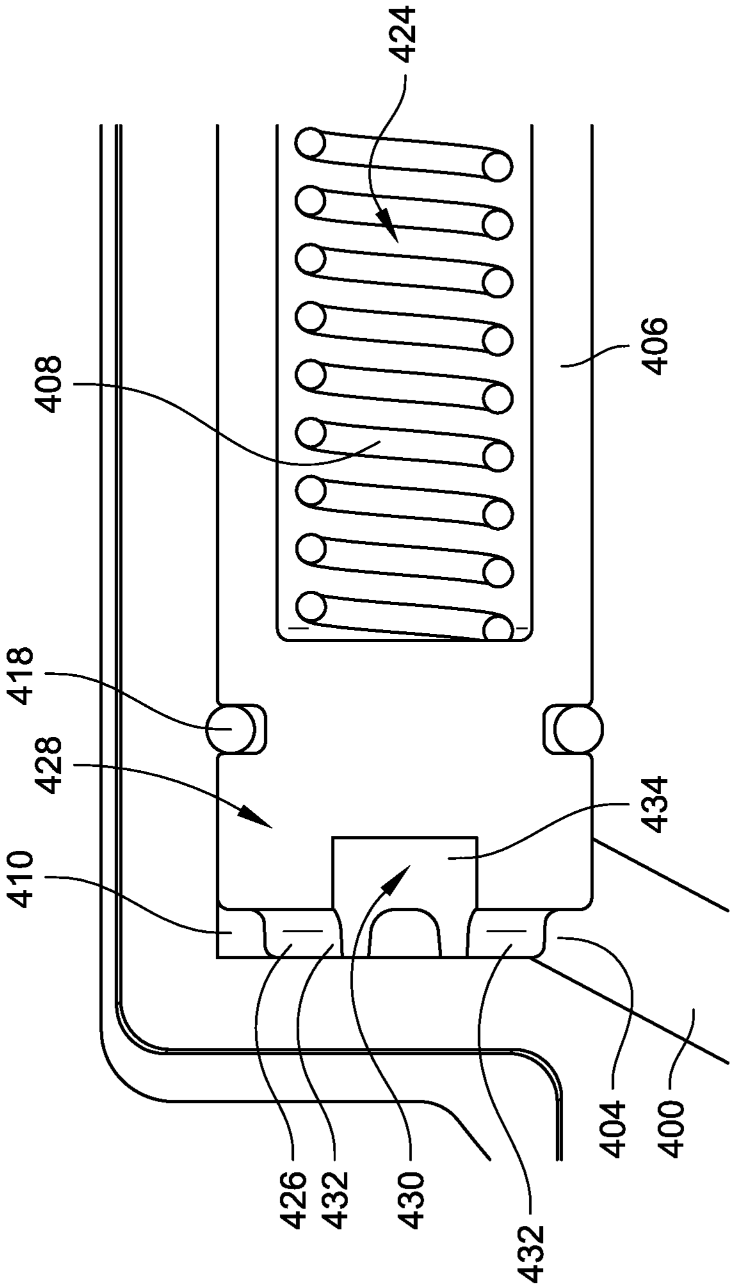
FIG. 6 is a partial cross-sectional elevation view of the air pressure indicator of FIG. 4, with the plunger against a surface of an air pressure indicator chamber, in accordance with example embodiments of the present disclosure.

In implementations, the pointer 500 is coupled between the housing 506 of the air pressure indicator 108 and a window held relative to the pointer 500 via the housing 104 of the pneumatic tool 104 (e.g., shown in FIG. 1B). Alternatively or additionally, the pointer 500 can be fixed to a window coupled to the plunger 406 (e.g., via the bracket 502, shown in FIG. 5B). While the air pressure indicators 108 are shown in FIGS. 5A and 5B as including a laterally-sliding pointer 500, the present disclosure is not limited to such arrangements, and can include other pointer orientations. For example, as shown in FIG. 5C, the air pressure indicator 108 can include a rotational pointer (e.g., a dial gauge) configured to receive pressurized air from the indicator fluid passageway 208.

In implementations, the plunger 406 includes a cavity 424 to house at least a portion of the spring 408, with at least a portion of the spring 408 positioned between the plug 412 and the plunger 406 within the cavity 424. The plunger 406 can include an air receipt structure 426 at an end 428 of the plunger 406, where the air receipt structure 426 can interface with the first end 410 of the chamber 410. For example, referring to FIG. 6, the plunger 406 includes the air receipt structure 426 defining an offset region 430 between the first end 410 of the chamber 410 and the end 428 of the plunger 406 when the spring 408 biases the plunger 406 towards the first end 410 of the chamber 402 (e.g., when the pneumatic tool 100 is not receiving pressurized air or when the pneumatic tool is currently operating). The offset region 430 of the air receipt structure 426 can provide an area for pressure to build within the chamber 402, such as upon initial startup of the pneumatic tool 100, to facilitate initial movement of the plunger 406 against the spring 408 towards the second end 422 of the chamber 402. For example, the air receipt structure 426 can include one or more projections 432 extending from the end 428 of the plunger 406 to interface with the 420 at the first end 410 of the chamber 402. Alternatively or additionally, the air receipt structure 426 can define one or more apertures 434 at the end 428 of the plunger 406 to receive air from the indicator fluid passageway 208 (e.g., via the fourth channel 400 and the air inlet 404). During initial startup of the pneumatic tool 100, pressurized air introduced to the handle 106 can enter the indicator fluid passageway 208, flow to the air inlet 404 and enter into the chamber 402 via the offset region 430 to push against the plunger 406.

The pneumatic tool 100 can include one or more structures to prevent grease, oil, or other contaminants that may be present in the air motor cylinder 202 (e.g., from lubricants or other sources) from interfering with operation of the air pressure indicator 108. For example, the pneumatic tool 100 can include a gasket 436 (e.g., shown in FIG. 4) coupled between the air motor cylinder 202 and the housing 104 of the pneumatic tool 100.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A pneumatic tool comprising:

an air motor cylinder, the air motor cylinder defining an interior configured to receive an air motor, the air motor cylinder further defining an inlet configured to receive pressurized air to supply to the air motor;

a tool handle coupled to the air motor cylinder, the tool handle defining a source fluid passageway fluidically coupled between the inlet of the air motor cylinder and an air inlet configured to receive pressurized air from a pressurized air source, the source fluid passageway configured to direct a first portion of pressurized air received by the air inlet to the inlet of the air motor cylinder;

an air pressure indicator coupled to the air motor cylinder, the air pressure indicator configured to provide an indication of a dynamic air pressure of the pneumatic tool, wherein the air pressure indicator includes a plunger slidably received within a chamber at least partially defined by the air motor cylinder; and an indicator fluid passageway fluidically coupled between the air pressure indicator and the source fluid passageway, the indicator fluid passageway configured to divert a second portion of pressurized air received by the air inlet to the air pressure indicator.

2. The pneumatic tool of claim 1, wherein at least a portion of the indicator fluid passageway is defined by the air motor cylinder.

3. The pneumatic tool of claim 1, wherein the indicator fluid passageway includes an indicator intake aperture positioned downstream from the air inlet to divert the second portion of pressurized air, wherein the indicator intake aperture intercepts the source fluid passageway.

4. The pneumatic tool of claim 1, wherein the indicator fluid passageway includes an indicator intake aperture positioned downstream from the air inlet to divert the second portion of pressurized air during forward and reverse operation of the pneumatic tool.

5. The pneumatic tool of claim 1, wherein the indicator fluid passageway includes an indicator intake aperture positioned downstream from the air inlet to divert the second portion of pressurized air, wherein each of the indicator intake aperture and the inlet of the air motor cylinder intercept the source fluid passageway.

6. The pneumatic tool of claim 1, wherein a longitudinal position of the plunger is biased by a spring within the chamber, and wherein the indicator fluid passageway is configured to introduce the second portion of pressurized air to the plunger to push the plunger against the spring.

7. The pneumatic tool of claim 6, wherein the plunger includes a pointer coupled to the plunger, and wherein the pointer is configured to point to differing regions of a display dependent on a longitudinal position of the plunger.

8. A pneumatic tool comprising:

an air motor cylinder, the air motor cylinder defining an interior configured to receive an air motor, the air motor cylinder further defining an inlet configured to receive pressurized air to supply to the air motor;

a tool handle coupled to the air motor cylinder, the tool handle defining a source fluid passageway fluidically coupled between the inlet of the air motor cylinder and an air inlet configured to receive pressurized air from a pressurized air source, the source fluid passageway configured to direct a first portion of pressurized air received by the air inlet to the inlet of the air motor cylinder;

an air pressure indicator coupled to the air motor cylinder, the air pressure indicator configured to provide an indication of a dynamic air pressure of the pneumatic tool, wherein the air pressure indicator includes a plunger slidably received within a chamber at least partially defined by the air motor cylinder; and an indicator fluid passageway defined by the air motor cylinder and fluidically coupled between the air pressure indicator and the source fluid passageway, the indicator fluid passageway configured to divert a second portion of pressurized air received by the air inlet to the air pressure indicator, bypassing the inlet of the air motor cylinder.

9. The pneumatic tool of claim 8, wherein the indicator fluid passageway includes an indicator intake aperture positioned downstream from the air inlet to divert the second portion of pressurized air, wherein the indicator intake aperture intercepts the source fluid passageway.

10. The pneumatic tool of claim 8, wherein the indicator fluid passageway includes an indicator intake aperture positioned downstream from the air inlet to divert the second portion of pressurized air during forward and reverse operation of the pneumatic tool.

11. The pneumatic tool of claim 8, wherein the indicator fluid passageway includes an indicator intake aperture positioned downstream from the air inlet to divert the second portion of pressurized air, wherein each of the indicator intake aperture and the inlet of the air motor cylinder intercept the source fluid passageway.

12. The pneumatic tool of claim 8, wherein a longitudinal position of the plunger is biased by a spring within the chamber, and wherein the indicator fluid passageway is configured to introduce the second portion of pressurized air to the plunger to push the plunger against the spring.

13. The pneumatic tool of claim 12, wherein the plunger includes a pointer coupled to the plunger, and wherein the pointer is configured to point to differing regions of a display dependent on a longitudinal position of the plunger.

14. A pneumatic tool comprising:

an air motor cylinder, the air motor cylinder defining an interior configured to receive an air motor, the air motor cylinder further defining an inlet configured to receive pressurized air to supply to the air motor;

a tool handle coupled to the air motor cylinder, the tool handle defining a source fluid passageway fluidically coupled between the inlet of the air motor cylinder and an air inlet configured to receive pressurized air from a pressurized air source, the source fluid passageway configured to direct a first portion of pressurized air received by the air inlet to the inlet of the air motor cylinder;

an air pressure indicator coupled to the air motor cylinder, the air pressure indicator configured to provide an indication of a dynamic air pressure of the pneumatic tool, the air pressure indicator including a plunger slidably received within a chamber at least partially defined by the air motor cylinder, the air pressure indicator further including a spring biasing a longitudinal position of the plunger within the chamber; and an indicator fluid passageway defined by the air motor cylinder and fluidically coupled between the chamber of the air pressure indicator and the source fluid passageway, the indicator fluid passageway configured to divert a second portion of pressurized air received by the air inlet to the chamber, bypassing the inlet of the air motor cylinder.

15. The pneumatic tool of claim 14, wherein the indicator fluid passageway includes an indicator intake aperture positioned downstream from the air inlet to divert the second portion of pressurized air, wherein the indicator intake aperture intercepts the source fluid passageway.

16. The pneumatic tool of claim 14, wherein the indicator fluid passageway includes an indicator intake aperture positioned downstream from the air inlet to divert the second portion of pressurized air during forward and reverse operation of the pneumatic tool.

17. The pneumatic tool of claim 14, wherein the indicator fluid passageway includes an indicator intake aperture positioned downstream from the air inlet to divert the second portion of pressurized air, wherein each of the indicator intake aperture and the inlet of the air motor cylinder intercept the source fluid passageway.

18. The pneumatic tool of claim 14, wherein the plunger includes an air receipt structure positioned at an end of the plunger configured to interface with an end of the chamber at which the indicator fluid passageway is coupled, the air receipt structure including one or more protrusions extending from the end of the plunger.

* * * * *